US012660801B2

(12) United States Patent
Iyo

(10) Patent No.: US 12,660,801 B2
(45) Date of Patent: Jun. 23, 2026

(54) METHOD, INFORMATION PROCESSING DEVICE, AND PROGRAM

(71) Applicant: RABO, Inc., Tokyo (JP)

(72) Inventor: Yukiko Iyo, Tokyo (JP)

(73) Assignee: RABO, Inc., Tokyo (JP)

( * ) Notice: Subject to any disclaimer, the term of this patent is extended or adjusted under 35 U.S.C. 154(b) by 449 days.

(21) Appl. No.: 18/554,791

(22) PCT Filed: Apr. 5, 2022

(86) PCT No.: PCT/JP2022/017105
§ 371 (c)(1),
(2) Date: Oct. 11, 2023

(87) PCT Pub. No.: WO2022/230623
PCT Pub. Date: Nov. 3, 2022

(65) Prior Publication Data
US 2024/0196866 A1 Jun. 20, 2024

(30) Foreign Application Priority Data

Apr. 28, 2021 (JP) .................................. 2021-075752

(51) Int. Cl.
*A01K 29/00* (2006.01)
*G05B 15/02* (2006.01)
(52) U.S. Cl.
CPC ............ *A01K 29/005* (2013.01); *G05B 15/02* (2013.01)
(58) Field of Classification Search
CPC ............................... A01K 29/005; G05B 15/02
USPC ........................................................ 700/90
See application file for complete search history.

(56) References Cited

U.S. PATENT DOCUMENTS

| | | | |
|---|---|---|---|
| 2002/0156351 A1* | 10/2002 | Sagel ...................... | A23L 33/30 |
| | | | 600/587 |
| 2006/0041412 A1* | 2/2006 | Engelke ................ | G06Q 10/04 |
| | | | 705/300 |
| 2016/0012748 A1* | 1/2016 | Donavon .............. | G09B 19/00 |
| | | | 434/225 |
| 2016/0135484 A1 | 5/2016 | Ecochard | |
| 2017/0055875 A1* | 3/2017 | Candell ................ | A61B 5/4866 |
| 2017/0196203 A1* | 7/2017 | Huisma .................. | G08C 17/02 |
| 2018/0132519 A1* | 5/2018 | Solly .................... | A61B 5/4833 |
| 2023/0034337 A1* | 2/2023 | Gorski .................. | G07F 17/323 |

FOREIGN PATENT DOCUMENTS

| | | |
|---|---|---|
| JP | 2006-271228 A | 10/2006 |
| JP | 4209294 B2 | 1/2009 |
| JP | 2011-062112 A | 3/2011 |
| JP | 2019-058178 A | 4/2019 |
| WO | 2016185742 A1 | 11/2016 |

* cited by examiner

*Primary Examiner* — Md Azad
(74) *Attorney, Agent, or Firm* — HAUPTMAN HAM, LLP

(57) ABSTRACT

According to the present disclosure, a method includes, wherein a processor, acquiring an activity quantity data of an animal, calculating an exercise consumption energy quantity of the animal based on the activity quantity data, calculating an estimation consumption energy quantity of the animal based on an information of a body weight of the animal, correcting the estimated consumption energy quantity of the animal using the exercise consumption energy quantity of the animal, and outputting an information related to the corrected estimation consumption energy quantity.

11 Claims, 14 Drawing Sheets

1

21

Display control unit

211

Operation screen display
control unit

212

Data display control unit

Conventional calculation method

METHOD, INFORMATION PROCESSING DEVICE, AND PROGRAM

RELATED APPLICATIONS

The present application is a National Phase of International Application No. PCT/JP2022/017105 filed Apr. 5, 2022, which claims priority to Japanese Application No. 2021-075752, filed Apr. 28, 2021.

TECHNICAL FIELD

The present disclosure relates to a method, an information processing device, and a program.

BACKGROUND TECHNOLOGY

Recently, by growing a pet boom, a technology is being developed for watching over a pet and managing its health. For instance, Patent Literature 1 discloses the technology for feeding a required quantity according to an activity quantity of a feed target animal.

PRIOR ART LIST

Patent Document

Patent literature 1: Japanese Unexamined Patent Publication No. 2006-271228

SUMMARY OF THE INVENTION

Technical Problem

However, the technology disclosed in the above patent literature 1 only calculates based on an activity of an animal that is a target of a feed, hereby calculating accuracy of a feed quantity is not sufficient.

Therefore, an object of the present disclosure is to provide a method, an information processing device, and a program capable of outputting the information necessary for a health management of the animal that is the target of the feed with higher accuracy.

Technical Solution

According to the present disclosure, a method includes, wherein a processor, acquiring an activity quantity data of the animal, calculating an exercise consumption energy quantity of the animal based on the activity quantity data, calculating an estimation consumption energy quantity of the animal based on an information of a body weight of the animal, correcting the estimated consumption energy quantity of the animal using the exercise consumption energy quantity of the animal, and outputting an information related to the corrected estimation consumption energy quantity, is provided.

In addition, according to the present disclosure, an information processing device comprising, an acquisition unit acquires the activity quantity data of the animal, an exercise consumption energy quantity calculation unit calculates the exercise consumption energy quantity of the animal based on the activity quantity data, an estimation consumption energy quantity calculation unit calculates an estimation consumption energy quantity of the animal based on the information of the body weight of the animal, an correction processing unit corrects the estimated consumption energy quantity of the animal using the exercise consumption energy quantity of the animal, and an output control unit outputs the information related to the corrected estimation consumption energy quantity, is provided.

In addition, according to the present disclosure, a program functionalizes to a computer such as, the acquisition unit acquires the activity quantity data of the animal, the exercise consumption energy quantity calculation unit calculates the exercise consumption energy quantity of the animal based on the activity data, the estimation consumption energy quantity calculation unit calculates the estimation consumption energy quantity of the animal based on the information of the body weight of the animal, the correction processing unit corrects the estimated consumption energy quantity of the animal using the exercise consumption energy quantity of the animal, and the output control unit outputs the information related to the corrected estimation consumption energy quantity, is provided.

Advantageous Effects

According to the present disclosure, it is possible to output the information necessary for the health management of the animal that is the target of the feed with higher accuracy.

DETAILED DESCRIPTION OF THE EMBODIMENTS

Figure 1:
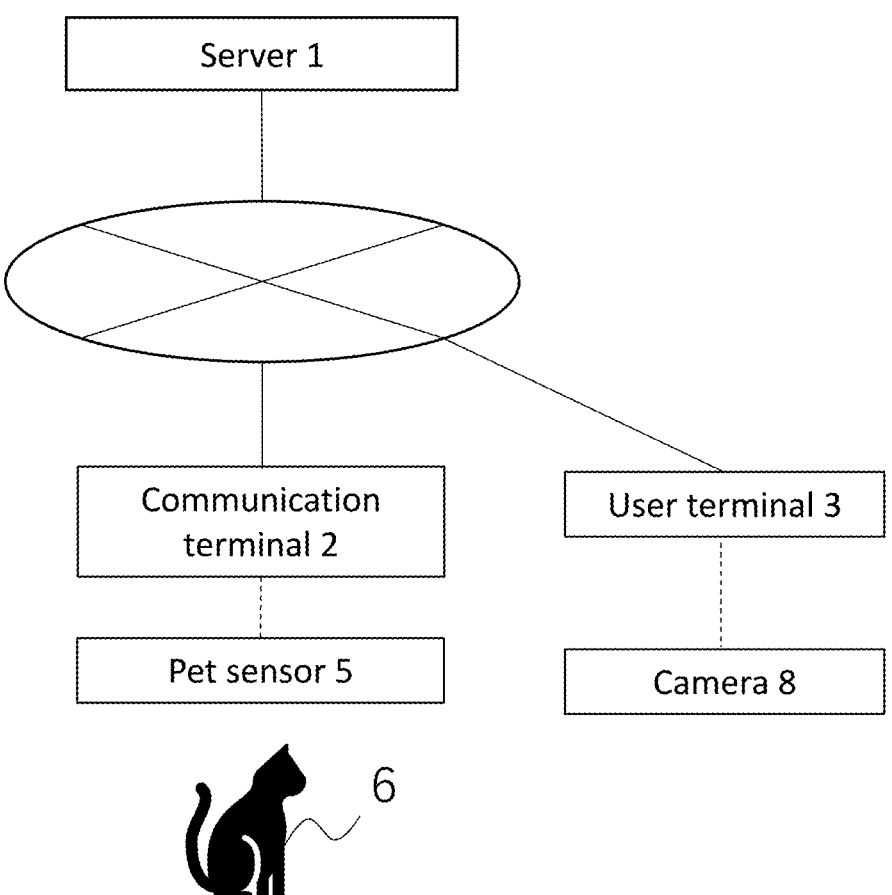
FIG. 1 is a diagram showing a configuration instance of a system configuration for according a one embodiment of the present disclosure.

The following is a list and description of the contents of the embodiment of the present disclosure. The present disclosure comprises the following.

Item 1

A method,
wherein a processor includes:
acquiring an activity quantity data of an animal;
calculating an exercise consumption energy quantity of the animal based on the activity quantity data;
calculating an estimation consumption energy quantity of the animal based on an information of a body weight of the animal;
correcting the estimated consumption energy quantity of the animal using the exercise consumption energy quantity of the animal; and
outputting the information related to the corrected estimation consumption energy quantity.

Item 2

The method according to item 1 includes;
Wherein the processor:
outputting the information related to a recommendation feed quantity of the animal based on the corrected estimated energy consumption quantity.

Item 3

The method according to item 2,
outputs the information related to the recommendation feed quantity of the animal based on the information acquired by comparing a current body shape of the animal and an ideal body shape of the animal.

Item 4

The method according to items 2 or 3,
wherein outputting the recommendation feed quantity of the animal is,
including, based on an ingestion calorie quantity per a weight for a predetermined food, outputting the recommendation feed quantity of the predetermined food.

Item 5

The method according to item 4,
wherein the processor further includes:
specifying the predetermined food based on at least one of an individual characteristic of the animal and the corrected estimation consumption energy quantity.

Item 6

The method according to any one of items 2 to 5,
wherein the processor,
further acquires the information on an ingestion quantity of an actual food of the animal, and
further outputs the information based on comparing between the ingestion quantity of the actual food and the recommendation feed quantity.

Item 7

The method according to any one of items 1 to 6,
wherein the processor calculates the estimation consumption energy quantity of the animal based on the information of an ideal body weight of the animal.

Item 8

The method according to item 7,
wherein the information of the ideal body weight is acquired based on the information of the body weight of the animal and a body type information of the animal.

Item 9

The method according to any one of items 1 to 8,
wherein the processor calculates the estimation consumption energy quantity of the animal further based on the information related to a life stage of the animal.

Item 10

The method according to any one of items 1 to 9,
wherein correcting the estimation consumption energy quantity of the animal, includes, not only excluding a predetermined percentage of a consumption energy quantity corresponding to an exercise of the animal in the estimation consumption energy quantity, but also adding the exercise consumption energy quantity of the animal calculated based on an acquired activity quantity data.

Item 11

The method according to any one of items 1 to 10,
wherein, the activity quantity data is acquired based on an amplitude of an acceleration data acquired by an acceleration sensor attached to or mounted to the animal.

Item 12

An information processing device comprising:
an acquisition unit acquires the activity quantity data of the animal;
an exercise consumption energy quantity calculation unit calculates the exercise consumption energy quantity of the animal based on the activity quantity data;
an estimation consumption energy quantity calculation unit calculates the estimation consumption energy quantity of the animal based on the information of the body weight of the animal;
a correction processing unit corrects the estimated consumption energy quantity of the animal using the exercise consumption energy quantity of the animal; and
an output control unit outputs the information related to the corrected estimation consumption energy quantity.

Item 13

A program functionalizes to a computer such as:
the acquisition unit acquires the activity quantity data of the animal;

the exercise consumption energy quantity calculation unit calculates the exercise consumption energy quantity of the animal based on the activity data;

the estimation consumption energy quantity calculation unit calculates the estimation consumption energy quantity of the animal based on the information of the body weight of the animal;

the correction processing unit corrects the estimated consumption energy quantity of the animal using the exercise consumption energy quantity of the animal; and the output control unit outputs the information related to the corrected estimation consumption energy quantity.

DETAILS OF EMBODIMENTS

Below, embodiments of the present disclosure will be described with reference to the drawings.

Overview

A system (an information processing system) according to the embodiment of the present disclosure estimates a consumption energy of a pet based on a measurement data acquired from the variety of sensors such as an acceleration sensor and a weight sensor attached to the pet. As shown in FIG. 1, the system of the present disclosure includes, a server 1, in addition, a pet sensor 5, a communication terminal 2, and a user terminal 3 that are connected to the server 1 via a network such as Internet or the like. In FIG. 1, for convenience of explanation, the one pet sensor 5, the one communication terminal 2, and the one user terminal 3 for each are shown, however a plurality of terminals can be connected to the network of this system.

The pet sensor 5 attached to the pet may be, for instance, the acceleration sensor or the like. The pet sensor 5 is attached to a cat 6 that is one instance of the animal (the pet). An instance of the pet sensor 5 may be a not shown weight sensor such as a weight scale. The weight sensor is contacted to the pet by the pet rides on the weight sensor, and there is a measuring tool for the body weight of the pet, the measuring tool for an excrement (a stool, a urine) of the pet, the measuring tool for an ingestion energy quantity (a food, a water) of the pet. The weight sensor may be provided on a bed, a toilet, or a tableware itself, or may be installed on a table on they are placed.

The server 1 can provide a service to the user terminal 3 via an application. The user terminal 3 downloads the application from the server 1 or another server, executes this application, and by accesses the server 1 via a web page browsing software such as a browser or the like, transmitting and receiving an information to the server 1 and can receive the service from the server 1.

Figure 2:
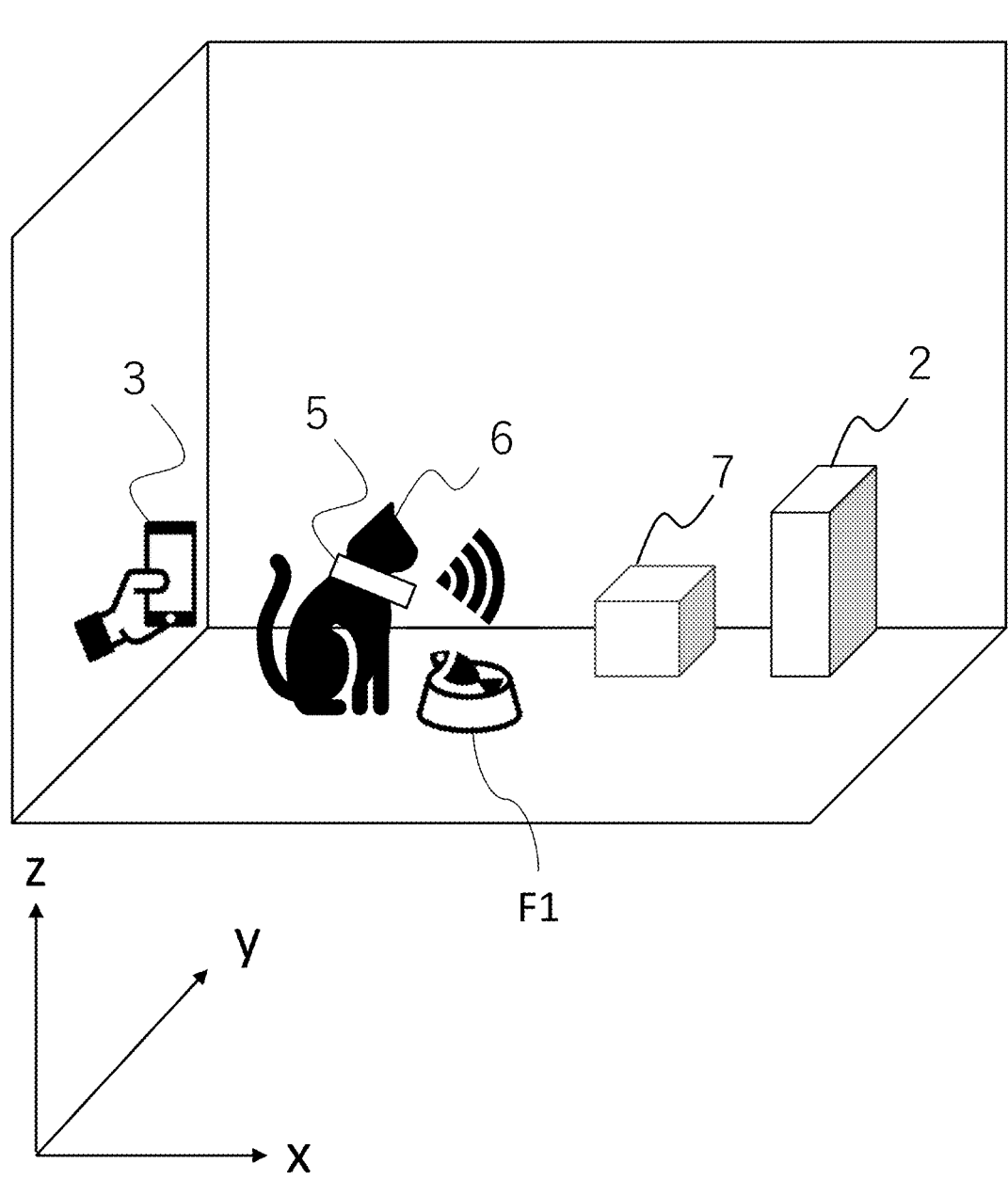
FIG. 2 is a conceptual diagram illustrates a sensing of an animal in a home according to the same embodiment.

The communication terminal 2 can acquire each a data by performing short-range wireless communication to the pet sensor 5 attached to the animal that, for instance, the cat 6. More specifically, first, as shown in FIG. 2, a collar-shaped (or pendant-shaped) wearable device is attached to the pet (the animal) 6 such as the cat 6 or the like. The animal referred to here may be the animal other than a human. A wearable device incorporates the pet sensor 5 such as the acceleration sensor or the like. The pet sensor 5 transmits the data to a receive device 7 installed in a same home via short-range wireless communication such as BLUETOOTH (registered trademark), LAW ENERGY (BLE) or the like, and the receive device 7 can transfer the data to the communication terminal 2 such as a router or the like. The communication terminal 2 transmits the data to the server 1 via the network. In addition, the pet sensor 5 may directly transmit the data to the user terminal 3 via the short-range wireless communication such as the BLE or the like. Here, the receiving device 7 can be installed for instance, Linux-based operating system, and can be mounted the variety of a sensor such as a temperature sensor for measuring an air temperature. However, it may a built-in chipset or the like that be not mounted an OS.

The pet sensor 5 is, for instance, the acceleration sensor. The acceleration sensor, as shown in FIG. 2, is the sensor that detects an acceleration of, mutually orthogonal, three axis directions (a x-axis, a y-axis, and a z-axis directions), and is incorporated a collar attached to a neck of the cat. As shown in FIG. 2, about the cat 6, a front-back direction is defined as a X direction, a left-right direction is defined as a Y direction, and an up-down direction is defined as a Z direction, in addition, the collar is attached to the cat 6 in order to be capable of detecting an acceleration signal in each a direction according to a movement of the cat 6. The type of sensor is not limited to this, and it can be adopted, such as a gyro sensor and a motion sensor, any sensing device that can acquire the information about the movement of the cat. In addition, the pet sensor 5 may be incorporated in the above described collar-shaped housing, or may be, in advance, a device that is attached to a skin of the animal or the like, or embedded.

The user terminal 3 may be, for instance, a general-purpose computer such as a workstation or a personal computer, or may be a smart phone, a tablet, a mobile terminal, or other an information terminal or the like. The user terminal 3 comprises a camera 8. The camera 8 is one instance of a first device. The camera 8 does not necessarily have to be provided in the user terminal 3 as an imaging device, and the camera 8 may be independent of the user terminal 3.

<Hardware Configuration>

The server 1 and the user terminal 3 according to the present embodiment have a following hardware configuration. In addition, the following configuration is one instance, and may have a configuration other than this.

The server 1 is connected to a database (not shown) and constitutes a part of a system. The server 1 may be the general-purpose computer such as the workstation or the personal computer, or may be logically realized by a cloud computing.

Figure 3:
FIG. 3 is a diagram showing a hardware configuration instance of a server 1 according to the same embodiment.
Figure 3:
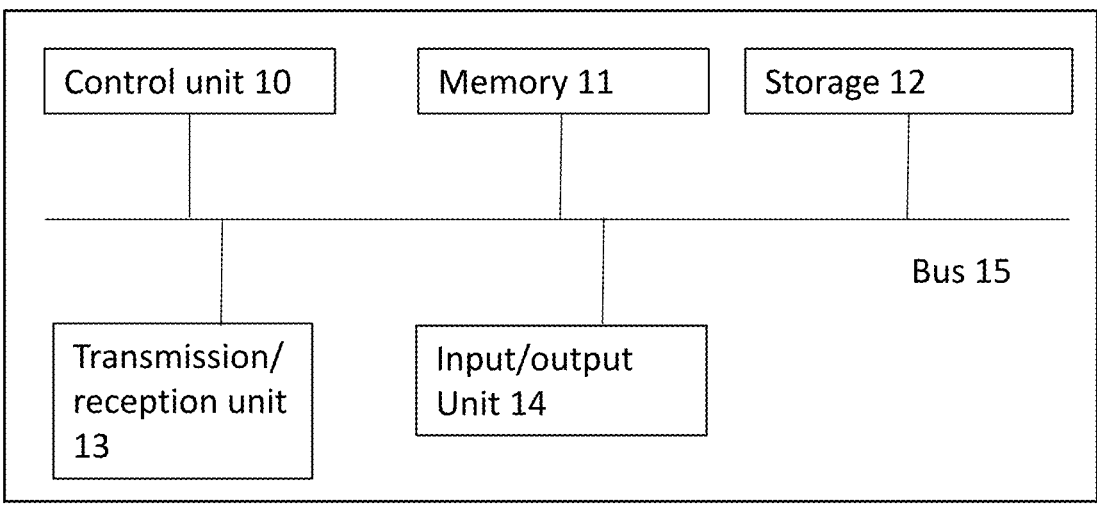

As shown in FIG. 3, the server 1 comprises at least a control unit 10, a memory 11, a storage 12, a transmission/reception unit 13, an input/output unit 14 or the like, and these are electrically connected to each other via a bus 15.

The control unit 10 controls an overall operation of the server 1, in addition is an arithmetic unit that controls a transmission and a reception of the data between each an element, executes the application, and executes an information processing necessary for an authentication processing. For instance, the control unit 10 is CPU (Central Processing Unit), and executes each the information processing by executes a program or the like stored in the storage 12 and read in the memory 11.

The memory 11 includes a main memory consisted a volatile memory device such as DRAM (Dynamic Random Access Memory) or the like, and an auxiliary memory consisted a non-volatile memory device such as a flash memory or HDD (Hard Disc Drive) or the like. The memory 11 is used as a work area or the like for the control unit 10, in addition stores, when the server 1 is starting, executed a BIOS (Basic Input/Output System) and the variety of setting information or the like.

The storage 12 stores the variety of the program such as an application program or the like. A database (not shown) storing the data used for each a processing may be constructed in the storage 12.

The transmission/reception unit 13 connects the server 1 to the network. In addition, the transmitting/receiving unit 13 may comprise a short-range communication interface of the Bluetooth (registered trademark) and the BLE (Bluetooth Low Energy).

The input/output unit 14 is an information input device such as a keyboard and a mouse or the like, and an output device such as a display or the like.

The bus 15 is commonly connected to the above elements and transmits, for instance, an address signal, a data signal and the variety of control signal.

<Software Configuration Instance>

Figure 4:
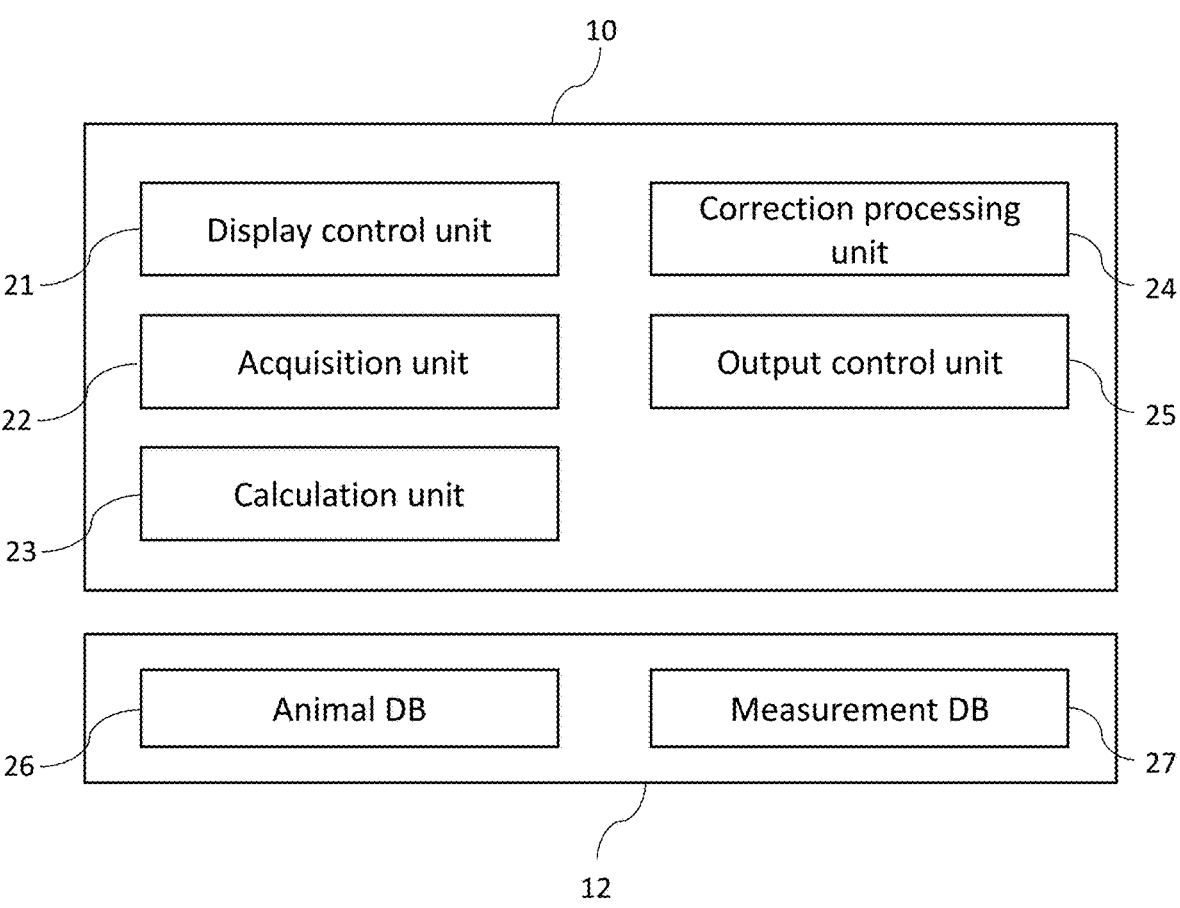
FIG. 4 is a diagram showing a software configuration instance of the server according to the same embodiment.

FIG. 4 is a diagram showing a software configuration instance of the server 1 in the system according to one embodiment of the present disclosure. The server 1 comprises a display control unit 21, an acquisition unit 22, a calculation unit 23, a correction processing unit 24, an output control unit 25, an animal DB (database) 26 and a measurement DB (database) 27. In addition, the display control unit 21, the acquisition unit 22, the calculation unit 23, the correction processing unit 24, and the output control unit 25 are realized, by the control unit 10 that the server comprises, reads the program stored in the storage 12 into the memory 11 and executes the program. Further, it is realized by the animal DB 26 and the measurement DB 27 are realized as a part of a storage area provided by at least one of the memory 11 and the storage 12.

Figure 5:
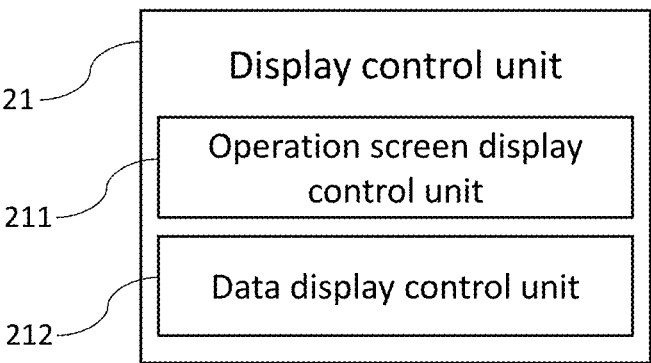
FIG. 5 is a diagram showing one instance of a detailed functional block of a display control unit according to the same embodiment.

The display control unit 21 has a function of controlling to display the display of the user terminal 3. In addition, the display control unit 21 may be included as a part of the output control unit. FIG. 5 is a diagram showing one instance of a detailed functional block of the display control unit 21 according to the present embodiment. The display control unit 21 comprises an operation screen display control unit 211 and a data display control unit 212.

The operation screen display control unit 211 has the function of displaying an operation screen to the user terminal 3. For instance, the operation screen display control unit 211 can display the operation screen for inputting, selecting, or confirming or the like, the information such as a body weight and a body shape or the like of the cat that the pet, and the information related to a meal quantity of the cat.

The data display control unit 212 has the function of displaying a display screen for displaying the data processed and generated by the server 1 to the user terminal 3. For instance, the data display control unit 212 displays a screen for the information related to a meal of the cat. The information related to the meal of the cat can include, for instance, will be described later, the information related to, about the cat, an estimation consumption energy, a required feed quantity, a history of the meal, and a recommendation of the food. The such information can be output by, for instance, will be described later, the output control unit 25.

Figure 6:
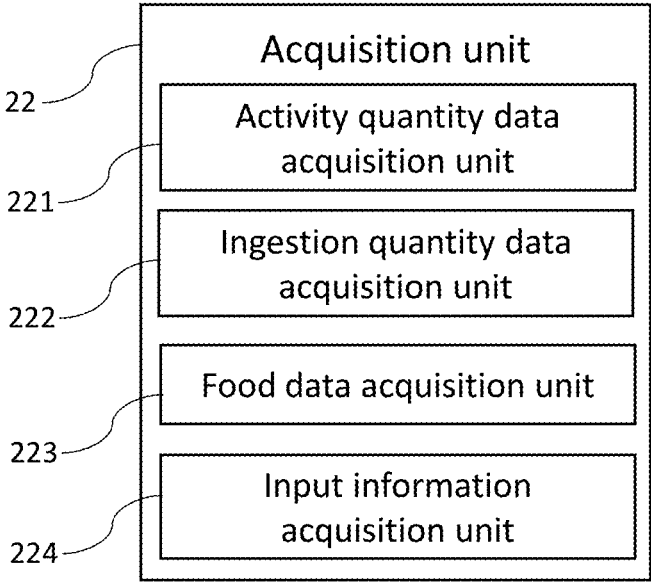
FIG. 6 is a diagram showing one instance of a detailed functional block of an acquisition unit according to the same embodiment.

The acquisition unit 22 has the function of acquiring an input information and the variety of the data from other devices. FIG. 6 is the diagram showing one instance of the detailed functional block of the acquisition unit 22 according to the present embodiment. The acquisition unit 22 comprises an activity quantity data acquisition unit 221, an ingestion quantity data acquisition unit 222, a food data acquisition unit 223 and an input information acquisition unit 224.

The activity quantity data acquisition unit 221 has the function of acquiring an activity quantity data of the animal (the pet). The activity quantity data is calculated, for instance, based on an acceleration data acquired by the acceleration sensor that is one instance of the pet sensor 5 described above. A magnitude of an amplitude of the acceleration data corresponds to the magnitude of acceleration based on an exercise of the cat attaching the wearable device, therefor, a sum of these amplitudes can be corresponded to a consumed energy by the exercise of the cat. For instance, the activity quantity data may be acquired, after processing the amplitude of the acceleration data acquired from the acceleration sensor to a predetermined processing, based on summing a predetermined period of time of the amplitude of the processed acceleration data. The predetermined processing may be, a processing for excluding the acceleration data based on, for instance, a daily activity or the like such as the meal and a grooming or the like, and, for instance, the processing is able to be by appropriately filtering a data portion that the amplitude is equal to or less than a predetermined value. It may also process to exclude the data portion with an amplitude is equal to or more than the predetermined value such as a sudden spike or a swing of the cat. In addition, for instance, based on the acceleration data, it is classified a behavior type (for instance, a sleep, the exercise, a rest, the meal, an excretion, or the like.) of the animal such as the cat or the like attaching the wearable device, and the information related to the behavior classification can be used to acquire the activity quantity data. For instance, only the activity quantity data during the exercise can be extracted by using to acquire the only acceleration data of the time period classified as "exercise". Further, by the action classification, it may process to exclude the acceleration data of the time period classified to a predetermined action corresponding to a resting time such as "the meal", "the grooming", "the sleep", and "the resting". Conversing from an acquired acceleration data to the activity quantity data may be performed in the server 1 or may be performed in the pet sensor 5 (that is, an edge processing).

The ingestion quantity data acquisition unit 222 has the function of acquiring the information about an ingestion quantity of an actual food of the animal. The ingestion quantity data is, for instance, acquired based on the input information related to, displayed on the user terminal 3 by the operation screen display control unit 211, the food ingested by the cat and its ingestion quantity. The ingestion quantity data here may be, for instance, the weight of an actually ingested food or the ingestion energy quantity converted from the weight. The ingestion quantity of the food may be acquired automatically or manually, for instance, based on a quantity or the weight change quantity of the food in a feed plate before and after the meal or a feed quantity of the food supplied from an automatic feeder or the like.

The food data acquisition unit 223 has the function of acquiring the information related to the food of the animal. The food data may include, for instance, the information related to an ingestion calorie quantity per the weight of the food. A calorie quantity ingested by the cat can be calculated based on the ingestion quantity data and the food data. The food data acquisition unit 223 can acquire the food data based on the input information related to the food ingested by the cat displayed to the user terminal 3 by the operation screen display control unit 211. In addition, the food data acquisition unit 223 may acquire the food data based on the information disclosed on Internet or the like.

The input information acquisition unit 224 has the function of acquiring the information based on an operation input to the user terminal 3 by a user. For instance, as will be described later, when the user selects the pet that is a target and performs the information such as the body weight or the like by the operation input, the input information acquisition unit 224 can acquire the information input to the user terminal 3.

Figure 7:
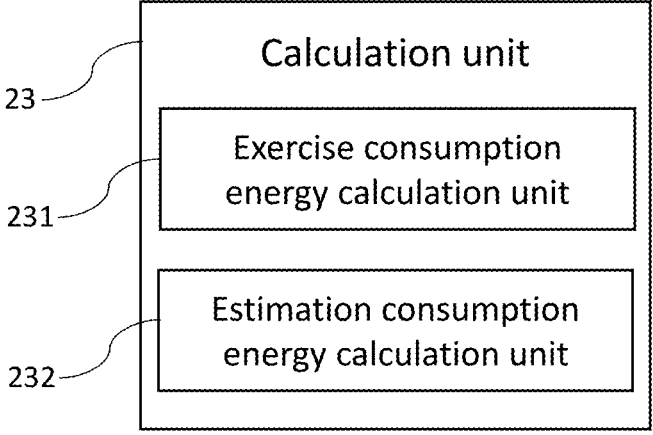
FIG. 7 is a diagram showing one instance of a detailed functional block of a calculation unit according to the same embodiment.

The calculation unit 23 has the function of calculating the energy quantity based on acquired the variety of the data. FIG. 7 is a diagram showing one instance of the detailed functional block of the calculation unit 23 according to present embodiment. The calculation unit 23 comprises an exercise consumption energy calculation unit 231 and an estimated consumption energy calculation unit 232.

The exercise consumption energy calculation unit 231 has the function of calculating the exercise consumption energy quantity of the animal based on the activity quantity data. Specifically, the exercise consumption energy calculation unit 231 can calculate the exercise consumption energy of the animal from the activity quantity data acquired based on the acceleration data and a current body weight data of the animal. That is, the product of the weight (a body weight of the animal) and the sum (the activity data) of the amplitude of the acceleration are correspond to the exercise energy quantity, hereby the exercise consumption energy quantity can be calculated. In addition, when the current body weight data of the animal is unknown, a provisional body weight data may be used.

Further, when calculating the exercise consumption energy quantity, a predetermined coefficient for adjusting the numerical value may be used.

The estimation consumption energy calculation unit 232 has the function of calculating the estimation consumption energy quantity of the animal based on the information of the ideal body weight of the animal and the information related to a life stage of the animal. The ideal body weight of the animal means the body weight that is determined based on a body shape information of the animal and the information of the body weight of the animal. The body shape of the animal is determined based on, for instance, BCS (Body Condition Score) or the like. The BCS is divided into, for instance, a plurality of stages, and according to each stage, it can be set that the ratio of a current body weight for the ideal body weight. More specifically, when the cat has the BCS of 9, 130% of the ideal body weight can be taken as the current body weight. The BCS can be acquired using a publicly known information. In addition, the BCS may be specified by analyzing, for instance, an image acquired by imaging the animal by the camera 8 provided in the user terminal 3. By using the ideal body weight of the animal, a metabolic-based energy consumption can be considered. Further, the information related to the life stage of the animal is, for instance, the information based on the information that, related to the animal, an age, or a presence or an absence of a contraception/a castration, whether the animal is a pregnant/a postpartum, whether the animal has a tendency toward obesity or the like. By calculating the estimation consumption energy quantity by using the information, the consumption energy of the animal can be estimated with higher accuracy. In addition, a method for calculating the estimation consumption energy quantity is not limited to the method described above. For instance, the estimation consumption energy calculation unit 232 can also calculate the estimation consumption energy quantity based on the information of the ideal body weight of the animal. However, by using the information related to the life stage, it is possible to reflect more accurately a state of a metabolism according to the life stage of the animal. In addition, the estimation consumption energy calculation unit 232 may calculate the estimation consumption energy quantity based on, for instance, the information related to, about the animal, a past meal quantity and changes the body weight (for instance, a time-series information). In this way, the estimation consumption energy calculation unit 232 can calculate the estimation consumption energy quantity of the animal based on the information of the body weight of the animal.

The correction processing unit 24 has the function of correcting the estimation consumption energy quantity of the animal using the exercise consumption energy quantity of the animal. Specifically, the estimation consumption energy quantity calculated by the estimation consumption energy calculation unit 232 described above is considered all of the consumption energy quantity of the target animal in one day, and includes also the exercise consumption energy quantity. However, the exercise consumption energy quantity included in the estimation consumption energy quantity is only a general value, hereby an unchanged value is not accurate. Therefore, the correction processing unit 24 processes to exclude from the calculated estimation consumption energy quantity to a predetermined proportion of consumption energy quantity corresponding to the exercise of the animal, and adding the calculated exercise consumption energy quantity of the animal. Hereby since the consumption energy quantity by the exercise is calculated based on an actual activity quantity data, it is possible to estimate the consumption energy quantity more according to the exercise of the actual animal.

Figure 8:
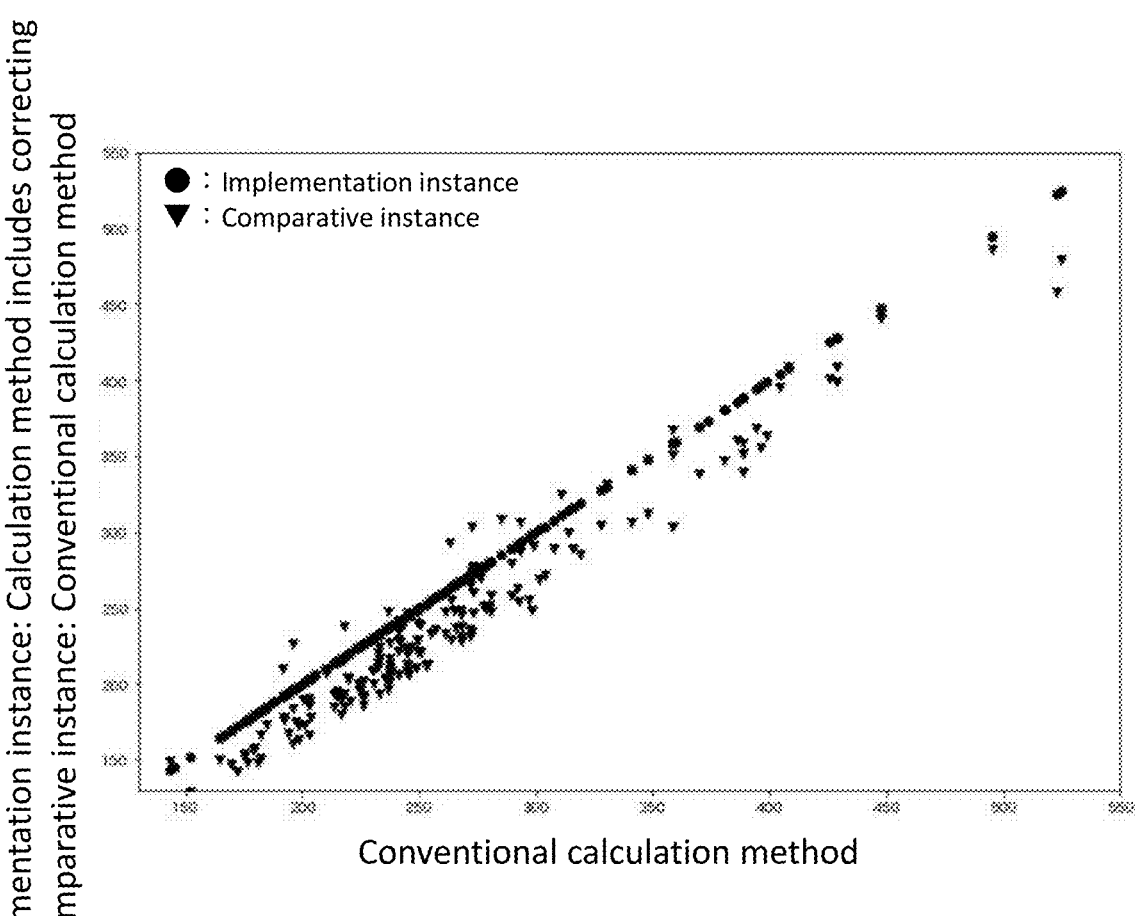
FIG. 8 is a graph showing an effect of correcting an estimation consumption energy quantity by a correction processing unit 24 according to the same embodiment.

FIG. 8 is a graph showing the effect of correcting the estimation consumption energy quantity by the correction processing unit 24 according to the present embodiment. The graph shown in FIG. 8 plots, each of an acquired data from an individual, the value of the estimation consumption energy quantity according to a practical instance, in addition the comparative instance. A horizontal axis indicates the value of the estimation consumption energy quantity that has not been corrected by the correction processing unit 24, and a vertical axis indicates, about the practical instance, the value of the estimation consumption energy quantity newly calculated by correcting by the correction processing unit 24, in the comparative instance, the values of a conventional (that is, calculated by the estimation consumption energy calculation unit 232) estimation consumption energy quantity (that is, the same value as shown on the horizontal axis) are shown. As shown in FIG. 8, in the practical instance, it understands that, by correcting the value based on the activity quantity data acquired from the accelerometer actually worn by the animal, the estimation consumption energy quantity based on much or few of the activity is acquired. In addition, in the comparative instance, a higher value than the value shown in the practical instance is shown, and it can be seen that the estimation consumption energy quantity is overestimated. From this, it can be seen effective that the correction adding the exercise consumption energy quantity acquired based on the activity quantity data.

The output control unit 25 has the function of outputting the information related to the corrected estimation consumption energy quantity. For instance, the output control unit 25 may display the corrected estimation consumption energy quantity to the screen of the user terminal 3 as a numerical value or in a display form such as a graph or the like. The information related to the corrected estimated energy consumption to be output may be information related to the corrected estimation consumption energy quantity itself, or may be a statistical data related to the corrected estimation consumption energy quantity. The statistical data related to the corrected estimation consumption energy quantity may be, for instance, an average data during the predetermined period (for instance, a one week or a one month), or a history or the like of the estimation consumption energy quantity during the predetermined period in the past.

In addition, the output control unit 25 may output the information related to a recommended feed quantity of the animal based on the corrected estimation consumption energy quantity. The recommended feed quantity may be, for instance, the feed quantity suitable for maintaining, increasing, or decreasing or the like the body weight or the like according to the estimation consumption energy quantity. The estimation consumption energy quantity varies according to the exercise consumption energy quantity of the animal as described above, hereby the recommend feed quantity may also vary accordingly. The recommend feed quantity may be output based on, for instance, an ingestion calorie quantity per the weight of a predetermined food. Hereby, it is possible to quickly determine how much of the predetermined food should be given to the animal such as the cat or the like.

In addition, the output control unit 25 may output the information related to the recommend feed quantity based on the information acquired by comparing a current body shape of the animal and the ideal body shape of the animal. For instance, when the cat is fatter than usual, in order to bring the cat closer to a standard body shape, the output control unit 25 may output the recommend feed quantity by adding the information based on comparing of the body shape to the estimation consumption energy quantity. The information acquired by comparing the body type may be, for instance, the information based on a combination of a current BCS and a target BCS. Further an output target may be the ingestion energy quantity or the like instead of the recommend feed quantity.

In addition, the output control unit 25 may specify and output the predetermined food based on at least one of an individual characteristic of the animal and the corrected estimation consumption energy quantity. The function may include, for instance, when the estimation consumption energy quantity is acquired, suggesting appropriate food by considering the individual characteristic of the animal. A specifying the predetermined food may be, for instance, performed from a food that the user has already the pet or performed from the food sold through Internet shopping or the like. Further, the individual characteristic of the animal may be a characteristic related to the life stage described above, the characteristic related to, about the animal, an age, a preference, a physical characteristic, a current disease history, a past hospital history, a physical condition or the like. Hereby it can feed a right quantity of a right food to the animal.

In addition, the output control unit 25 may output the information based on comparing between the ingestion quantity of the actual food of the animal acquired by the ingestion quantity data acquisition unit 222 and the recommendation feed quantity. For instance, the output control unit 25 compares the ingestion energy quantity of the actual food and the ingestion energy quantity corresponding to the recommendation feed quantity or the corrected estimation consumption energy quantity, and may output the information based on its comparing. The information based on comparing may be, for instance, as standard that the ingestion energy quantity corresponding to the corrected estimation consumption energy quantity, the information indicating how large or small the energy quantity that is ingested. Hereby the user can know whether or not the feed quantity is as targeted. In addition, the comparison target may be the ingestion quantity and the recommend ingestion quantity, or the ingestion energy quantity and corrected estimation consumption energy quantity.

The information output by the output control unit 25 is not limited to the information that a form of displayed on the screen of the user terminal 3. For instance, the information output by the output control unit 25 may be, on association with the information of each the animal, stored in the animal DB 26 that will be described later when it is necessary. In addition, the information output by the output control unit 25 may be output to an external server or the like.

The animal DB 26 is a database that stores the information related to the animal (the pet) attaching the pet sensor 5. In the animal DB 26, about each the animal, it is stored that a name, an animal species, the age, the body weight, the body type, a sex, an area, a health information (for instance, the current disease history, the past hospital history, a physical condition), the preference, the food, the physical characteristic, the life stage, or an owner information or the like. The information related to the food can be, for instance, by the user operates to the user terminal 3, acquired by the food data acquisition unit 223.

The measurement DB 27 is the database that stores the measurement data and the behavior data acquired from the animal (the pet) attaching the pet sensor 5. The measurement DB 27 can store the measurement data acquired from the pet sensor 5 of each the animal. Specifically, the measurement DB 27 can store the activity quantity data or the like acquired from the acceleration sensor provided in the pet sensor 5. In addition, the measurement DB 27 can store the behavior data determined based on the measurement data. The behavior data is, for instance, the data indicating the behavior such as the meal, the exercise, a vomiting, the excretion, and the sleep or the like, and can be stored together with the information related to the time during the behavior were performed.

<Processing Flow and Screen Display Instance>

Figure 9:
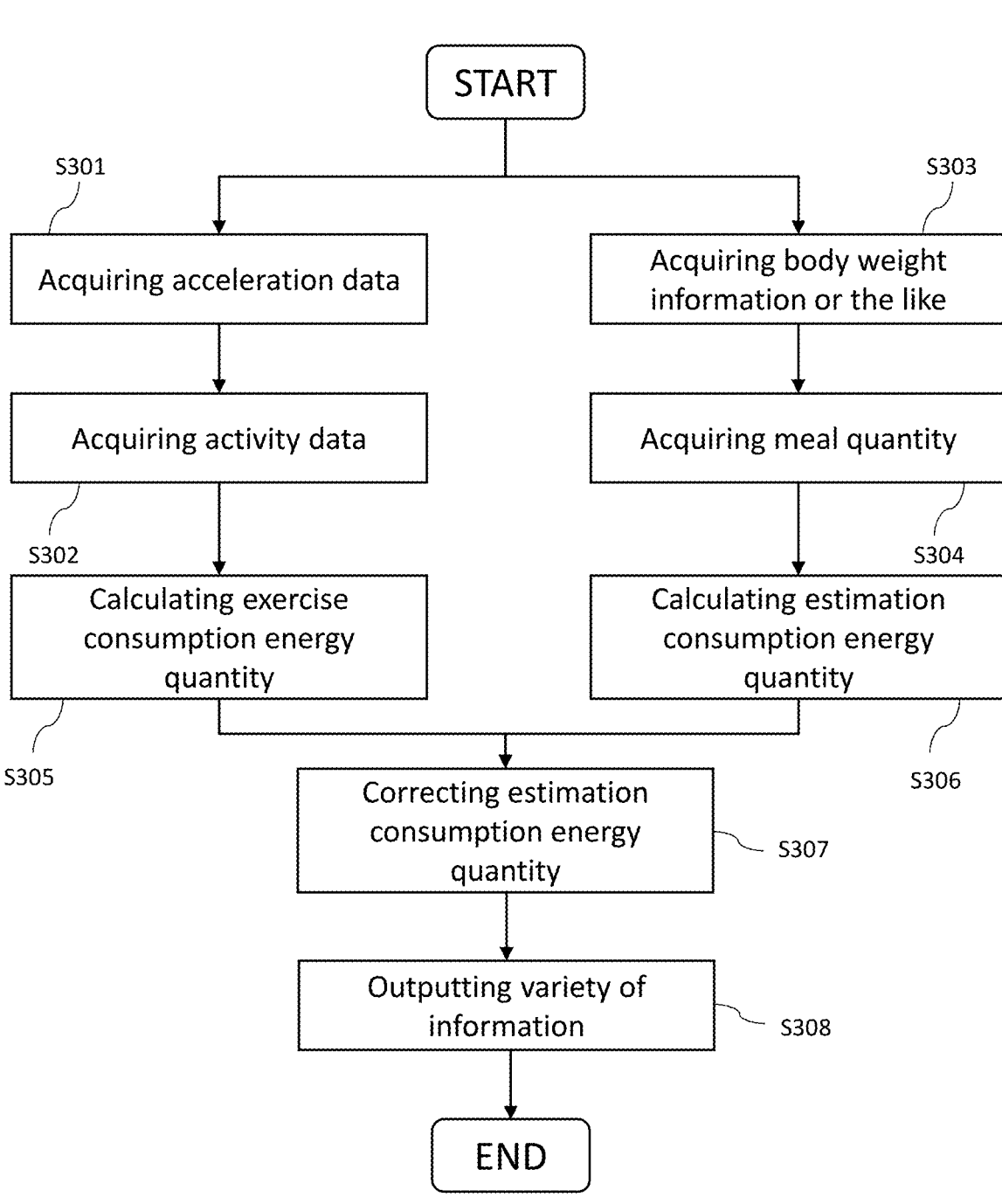
FIG. 9 is a flow chart showing an operation flow of a server 1 in the same embodiment.

FIG. 9 is a flow chart showing an operational flow of the server 1 according to the present embodiment. The flow of processing shown here is merely one instance.

First, the activity quantity data acquisition unit 221 acquires the acceleration data from the acceleration sensor of the pet sensor 5 (step S301). The acceleration data is a time-series data. The activity quantity data acquisition unit 221 may acquire the acceleration data continuously or intermittently. In addition, the sampling frequency is not particularly limited, and can be appropriately set according to, will be described later, the accuracy of the activity quantity data or a load of a processing data quantity or the like. Next, the activity quantity data acquisition unit 221 acquires the activity quantity data from the acquired acceleration data (step S302).

Figure 10:
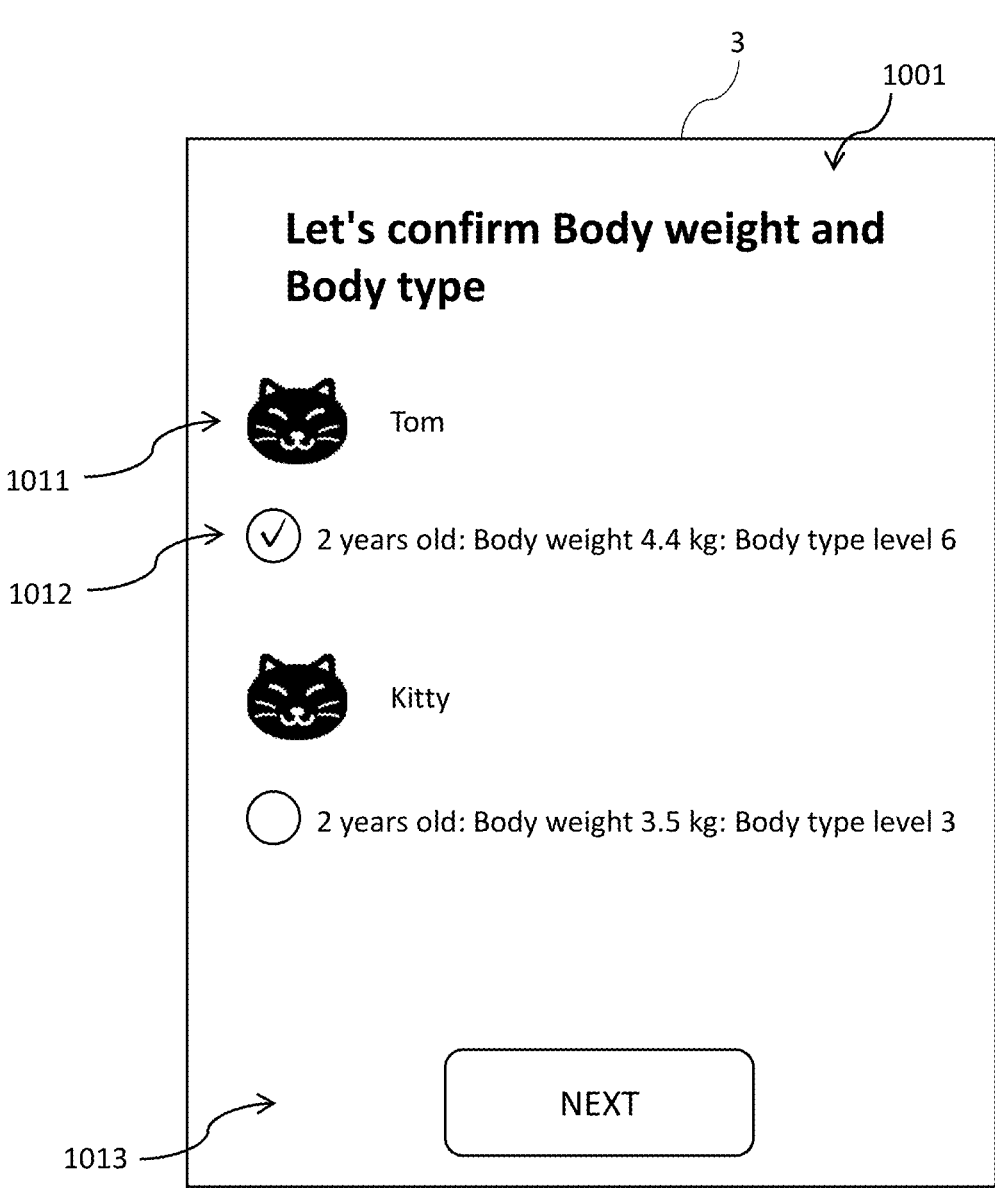
FIG. 10 is a first instance of a screen displayed by an operation screen display control unit 211 according to the same embodiment.

In addition, the operation screen display control unit 211 display the screen for selecting the pet that the target to the user terminal 3, and the acquisition unit 224 acquires, based on the user operation inputs to a displayed screen, a body weight information or the like of a selected pet from the animal DB 26 (step S303). FIG. 10 shows a first instance of the screen displayed by the operation screen display control unit 211 according to the present embodiment. As shown in FIG. 10, on the screen 1001 of the user terminal 3, an information 1011 of the pet of a selection target and an information 1012 such as the body weight or the like of the pet are displayed. The user can select a desired pet and edit the information such as the body weight or the like of the pet. When selecting the button 1013, it can translate the display of the screen to another display.

Figure 11:
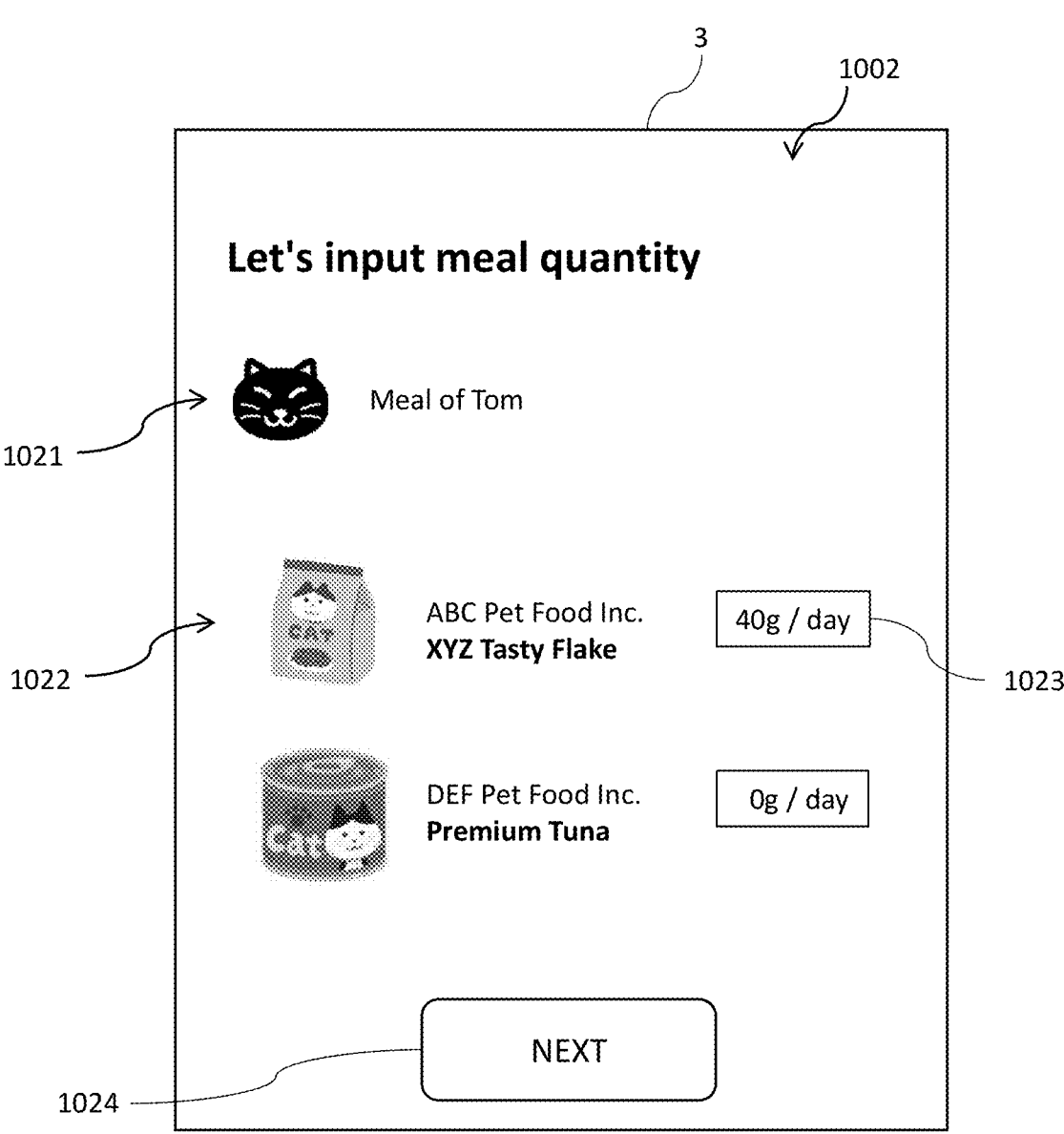
FIG. 11 is a second instance of a screen displayed by an operation screen display control unit 211 according to the same embodiment.

Next, the operation screen display control unit 211 displays the screen for inputting the meal quantity ingested by the selected pet to the user terminal 3, and the ingestion quantity data acquisition unit 222 can acquire, based on the user operation inputs the displayed screen, the information of the meal quantity of the pet (step S304). FIG. 11 is a second instance of the screen displayed by the operation screen display control unit 211 according to the present embodiment. As shown in FIG. 11, a screen 1002 of the user terminal 3 can include an information 1021 of the pet of the selection target, an information 1022 of the food, and a display 1023 for inputting an ingestion quantity. The user can input the ingestion quantity of the food fed to the pet. When selecting a button 1024, it can translate the display of the screen to another display.

In addition, the operation screen display control unit 211 may display the screen for displaying the information related to the food or for editing by the user operation inputs.

Figure 12:
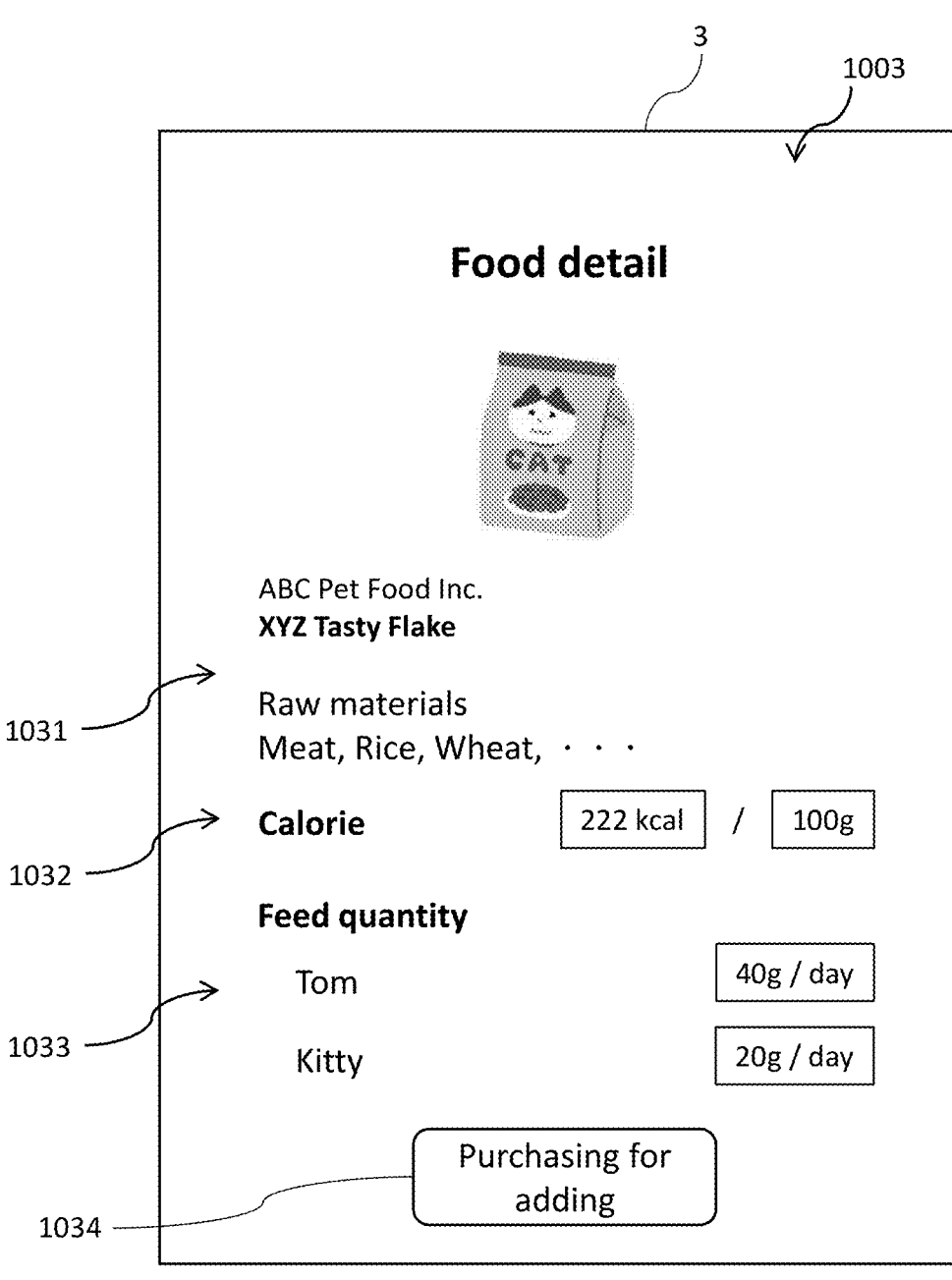
FIG. 12 is a third instance of a screen displayed by an operation screen display control unit 211 according to the same embodiment.

FIG. 12 shows a third instance of the screen displayed by the operation screen display control section 211 according to the present embodiment. As shown in FIG. 12, in a screen 1003 of the user terminal 3, a display 1031 related to a food content, a display 1032 of the energy quantity per the weight of the food, and a display 1033 of the feed quantity are displayed. In the display 1032, the energy quantity per the weight of the food may be editable displayed by the user the operation inputs to the user terminal 3. Further, the feed quantity displayed on the display 1033 may be, for instance, the quantity input on the screen 1002 shown in FIG. 11, or a past average feed quantity.

Next, the exercise consumption energy calculation unit 231 calculates the exercise consumption energy quantity based on the acquired activity quantity data (step S305). In addition, the estimation consumption energy calculation unit 232 calculates the estimated energy consumption quantity based on, about the animal, the ideal body weight and the information related to the life stage (step S306). The ideal body weight of the animal may be acquired in advance, for instance, displayed in FIG. 10, based on the body weight of the animal and a body type information (BCS). Next, the correction processing unit 24 performs correction processing of the estimation consumption energy quantity (step S307).

Figure 13:
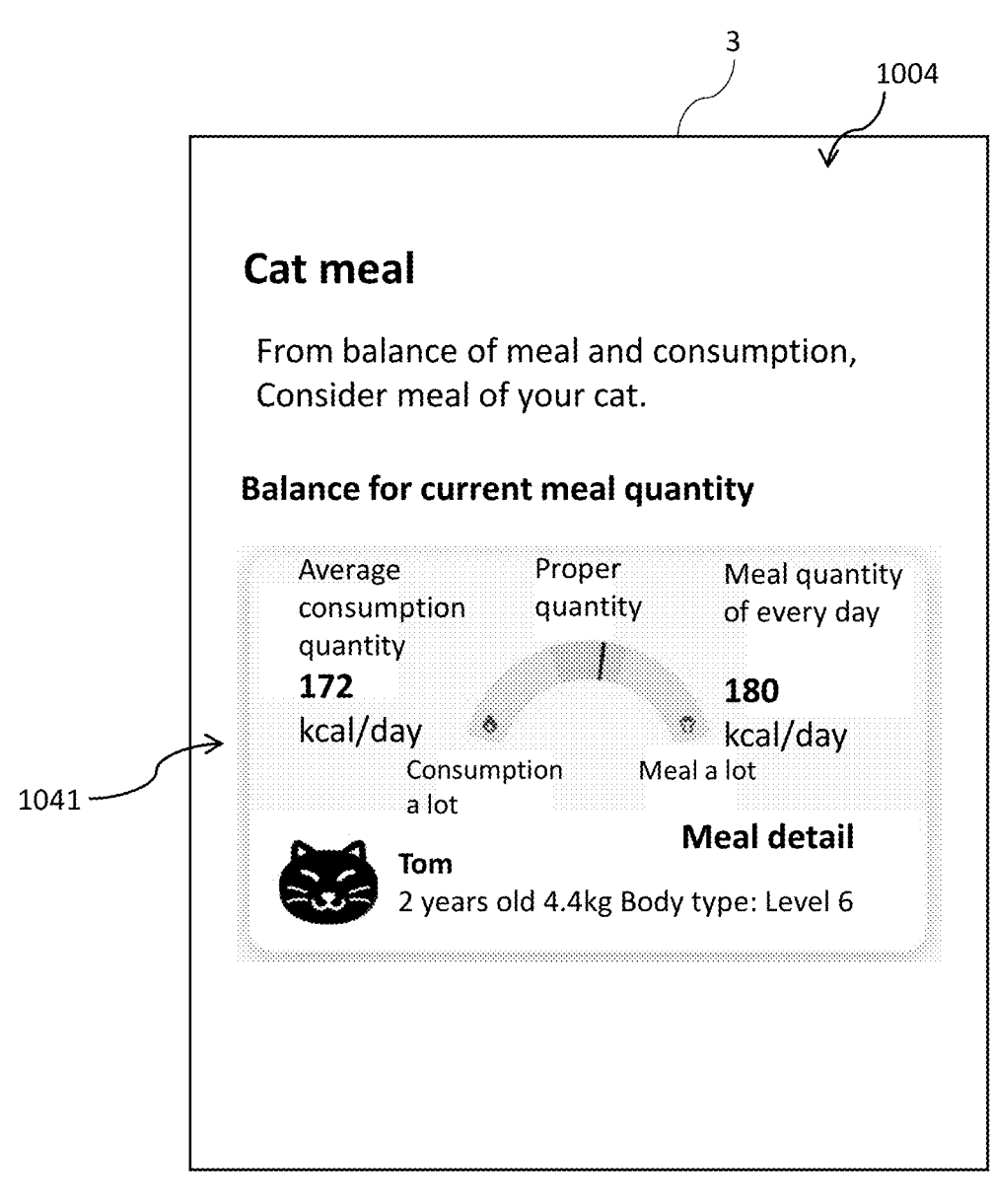
FIG. 13 is a first instance of a screen displayed by a data display control unit 212 according to the same embodiment.

Next, the output control unit 25 outputs the variety of information based on the information related to the corrected estimation consumption energy quantity (step S308). FIG. 13 is the first instance of the screen displayed by the data display control unit 212 according to the present embodiment. As shown in FIG. 13, the data display control unit 212 displays, to the screen 1004 of the user terminal 3, a graph 1041 based on, output by the output control unit 25, a numerical value of an average consumption quantity, a daily meal quantity, and a comparison of the respective numerical values. The average consumption quantity indicates, for instance, the corrected estimation consumption energy quantity per a one day in the predetermined period. The meal quantity of an everyday indicates, for instance, the ingestion energy quantity of the one day in the predetermined period. The graph 1041 visualizes a result acquired by comparing two numerical values. For instance, in the instance shown in FIG. 13, the average consumption quantity and the meal quantity of the everyday are relatively close, therefor those can be displayed in the graph 1041 as an "adequate quantity" area. For instance, the graph 1041 can be displayed, when the meal quantity of the everyday exceeds a predetermined standard from the average consumption quantity, it is displayed as an "excessive meal" area, and when the meal quantity of the everyday is lower than the predetermined standard from the average consumption quantity, it is displayed as an "excessive consumption" area.

Figure 14:
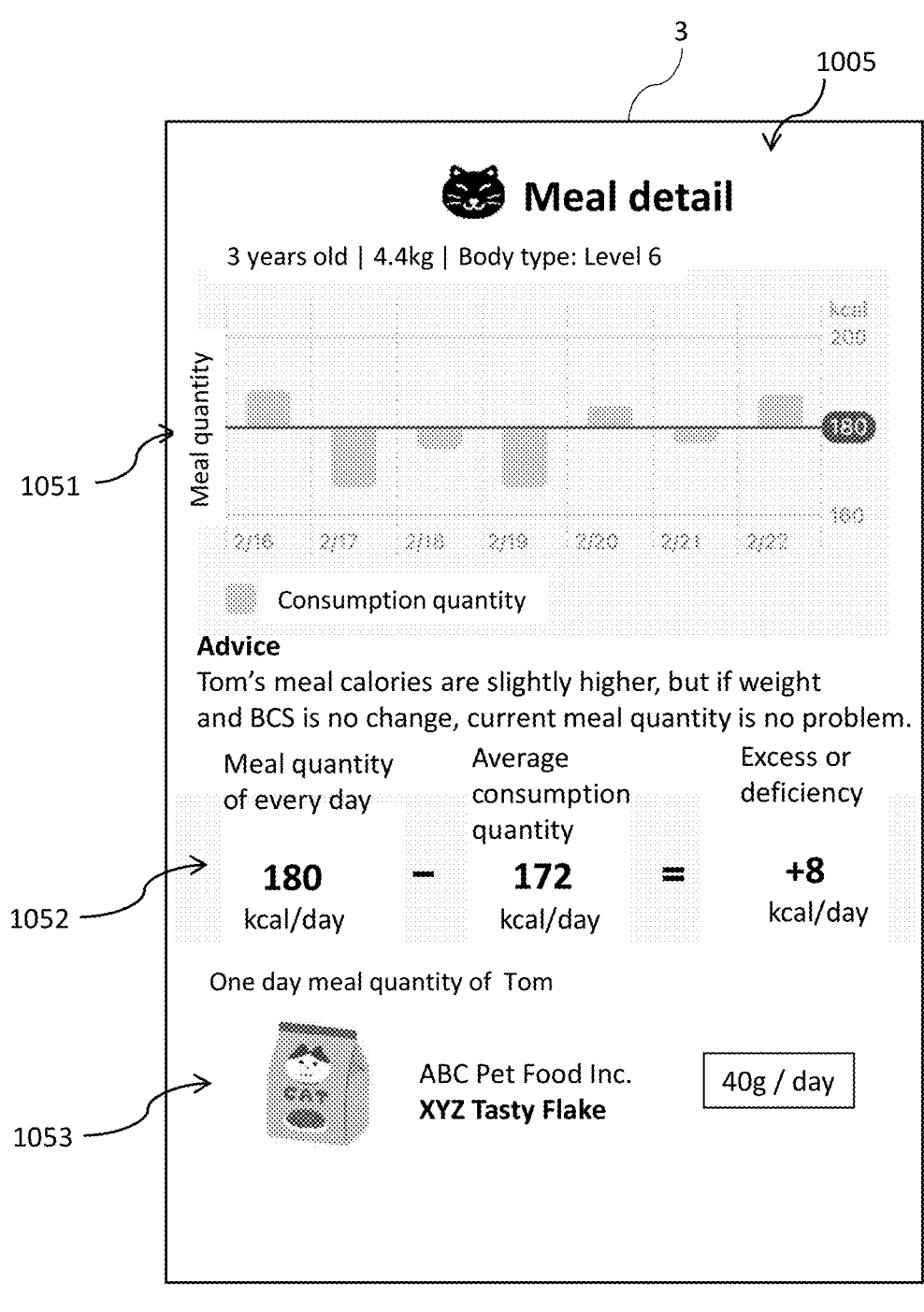
FIG. 14 is a second instance of a screen displayed by a data display control unit 212 according to the same embodiment.

FIG. 14 is the second instance of the screen displayed by the data display control unit 212 according to the present embodiment. As shown in FIG. 14, the data display control unit 212 displays, on the screen 1005 of the user terminal 3, a graph 1051 showing the history of the meal quantity during the one week, a display 1052 showing the comparison between the meal quantity and the estimation consumption energy quantity, an information 1053 of the fed food. The graph 1051 may display a size of the estimation consumption energy quantity based on the meal quantity of each the one day. In addition, by selecting a button 1054, it is also possible to translation to the screen purchasing for adding the food displayed in the information 1053 or the like. In addition, the screen 1005 may be provided with the display for the recommending food or the like suitable for the animal.

As described above, according to the present disclosure, for the estimation consumption energy quantity calculated based on, about the animal, the information related to the ideal body weight and the life stage, by correcting by using the exercise consumption energy quantity calculated based on the activity quantity data acquired from the acceleration sensor attached or the like to the animal or the like, the estimation consumption energy quantity of the animal can be acquired with higher accuracy. In particular, about the animal, a feeding environment and a living environment or the like can be reflected to calculate the exercise consumption energy quantity, in addition, about the animal, the information of the ideal body weight and the information of the life stage or the like can be reflected to the exercise consumption energy quantity other than an exercise. Hereby it possible to set an appropriate feeding quantity according to the condition of an individual animal and the exercise quantity in the one day. Therefore, the information required for a health management of the animal that a fed target can be output with higher accuracy, and the health management of the animal can be achieved more easily.

That is all, the preferred embodiments of the present disclosure have been described in a detail above with reference to the accompanying drawings, however a technical scope of the present disclosure is not limited to such the instance. It is obvious that those who have ordinary knowledge in the technical field of the present disclosure can conceive of various modifications or modifications within the scope of the technical idea described in the claims, these are naturally included within the technical scope of the present disclosure.

The device described in the present specification may be realized as a single device, or may be realized by the plurality of devices (for instance, a cloud server) or the like that all or part are connected to the network. For instance, the control unit 10 and the storage 12 of the server 1 may be realized by the different servers connected each other to the network.

A series of processes by the device described in the present specification may be realized using any of a software, a hardware, or a combination of a software and hardware. It is possible to produce the computer program for realizing the function of the server 1 according to the present embodiment and to implement in a PC or the like. In addition, a computer-readable recording medium storing such the computer program can be provided. It is, for instance, a magnetic disk, an optical disk, a magneto-optical disk, the flash memory, or the like. Further, the above computer program may be distributed, for instance, without using a recording medium, via the network.

In addition, the processing described using the flow chart in the present specification do not necessarily have to be executed in an illustrated order. Some processing steps may be executed in parallel. Further, an additional processing step may be adopted, and some the processing step may be omitted.

In addition, the effects described in the present specification are merely descriptive or exemplary, and are not limiting. In other words, the technology according to the present disclosure can produce, in addition to or instead of the above effects, the other effects that are obvious to those skilled in the art from the description of the present specification.

DESCRIPTION OF THE REFERENCE
NUMERALS 1 server (Information processing device)
3 user terminal
5 pet sensor
8 camera
10 control unit
12 storage
21 display control unit
22 acquisition unit
23 calculation unit
24 correction processing unit
25 output control unit
26 animal DB
27 measurement DB
221 activity quantity data acquisition unit
222 ingestion quantity data acquisition unit
231 exercise consumption energy calculation unit
232 estimation consumption energy calculation unit

The invention claimed is:

1. A method, wherein a processor includes:
acquiring an activity quantity data of an animal;
calculating an exercise consumption energy quantity of the animal based on the activity quantity data;
calculating an estimation consumption energy quantity of the animal based on an information of a body weight of the animal;
correcting the estimated consumption energy quantity of the animal using the exercise consumption energy quantity of the animal; and
outputting the information related to the corrected estimation consumption energy quantity,
wherein the information is related to a recommendation feed quantity of the animal based on the corrected estimated energy consumption quantity,
outputting the recommendation feed quantity of the animal is, including, based on an ingestion calorie quantity per a weight for a predetermined food, and
outputting the recommendation feed quantity of the predetermined food.

2. The method according to claim 1,
outputs the information related to the recommendation feed quantity of the animal based on the information acquired by comparing a current body shape of the animal and an ideal body shape of the animal.

3. The method according to claim 1,
wherein the processor further includes:
specifying the predetermined food based on at least one of an individual characteristic of the animal and the corrected estimation consumption energy quantity.

4. The method according to claim 1,
wherein the processor,
further acquires the information on an ingestion quantity of an actual food of the animal, and
further outputs the information based on comparing between the ingestion quantity of the actual food and the recommendation feed quantity.

5. The method according to claim 1,
wherein the processor calculates the estimation consumption energy quantity of the animal based on the information of an ideal body weight of the animal.

6. The method according to claim 5,
wherein the information of the ideal body weight is acquired based on the information of the weight of the animal and a body type information of the animal.

7. The method according to claim 1,
wherein the processor calculates the estimation consumption energy quantity of the animal further based on the information related to a life stage of the animal.

8. The method according to claim 1,
wherein correcting the estimation consumption energy quantity of the animal, includes, not only excluding a predetermined percentage of a consumption energy quantity corresponding to an exercise of the animal in the estimation consumption energy quantity, but also adding the exercise consumption energy quantity of the animal calculated based on an acquired activity quantity data.

9. The method according to claim 1,
wherein, the activity quantity data is acquired based on an amplitude of an acceleration data acquired by an acceleration sensor attached to or mounted to the animal.

10. An information processing device comprising:
an acquisition unit acquires the activity quantity data of the animal;
an exercise consumption energy quantity calculation unit calculates the exercise consumption energy quantity of the animal based on the activity quantity data;
an estimation consumption energy quantity calculation unit calculates the estimation consumption energy quantity of the animal based on the information of the body weight of the animal;
a correction processing unit corrects the estimated consumption energy quantity of the animal using the exercise consumption energy quantity of the animal; and
an output control unit outputs the information related to the corrected estimation consumption energy quantity,
wherein the information is related to a recommendation feed quantity of the animal based on the corrected estimated energy consumption quantity,
outputting the recommendation feed quantity of the animal is, including, based on an ingestion calorie quantity per a weight for a predetermined food, and
outputting the recommendation feed quantity of the predetermined food.

11. A program functionalizes to a computer such as:
the acquisition unit acquires the activity quantity data of the animal;
the exercise consumption energy quantity calculation unit calculates the exercise consumption energy quantity of the animal based on the activity data;

the estimation consumption energy quantity calculation unit calculates the estimation consumption energy quantity of the animal based on the information of the body weight of the animal;

the correction processing unit corrects the estimated consumption energy quantity of the animal using the exercise consumption energy quantity of the animal; and the output control unit outputs the information related to the corrected estimation consumption energy quantity, wherein the information is related to a recommendation feed quantity of the animal based on the corrected estimated energy consumption quantity, outputting the recommendation feed quantity of the animal is, including, based on an ingestion calorie quantity per a weight for a predetermined food, and outputting the recommendation feed quantity of the predetermined food.

\* \* \* \* \*